No. 740,536. PATENTED OCT. 6, 1903.
W. H. COBLE.
SEED PLANTER.
APPLICATION FILED DEC. 26, 1902.
NO MODEL.

Witnesses
W. H. Coble, Inventor
by
Attorneys

No. 740,536. Patented October 6, 1903.

UNITED STATES PATENT OFFICE.

WILLIAM H. COBLE, OF GALLINAS, TEXAS, ASSIGNOR OF TWO-THIRDS TO ROBERT L. COBLE, BENNETT JOHNSON AND WIFE N. J. JOHNSON, OF CALAVERAS, TEXAS.

SEED-PLANTER.

SPECIFICATION forming part of Letters Patent No. 740,536, dated October 6, 1903.

Application filed December 26, 1902. Serial No. 136,668. (No model.)

*To all whom it may concern:*

Be it known that I, WILLIAM H. COBLE, a citizen of the United States, residing at Gallinas, in the county of Atascosa and State of Texas, have invented a new and useful Seed-Planter, of which the following is a specification.

My invention relates to seed-planters, and is especially designed as a combined corn and cotton planter, and has for its objects to produce a device of this character which will be simple of construction, efficient in operation, and one in which all of the parts may be readily removed for the substitution of new ones or parts of a different form.

A further object of the invention is to produce a device which will plant the seed in hills at any desired predetermined distance apart or continuously or which may be readily adapted for distributing fertilizer.

The invention comprises the details of construction and combination of parts more fully hereinafter described.

Figure 1:
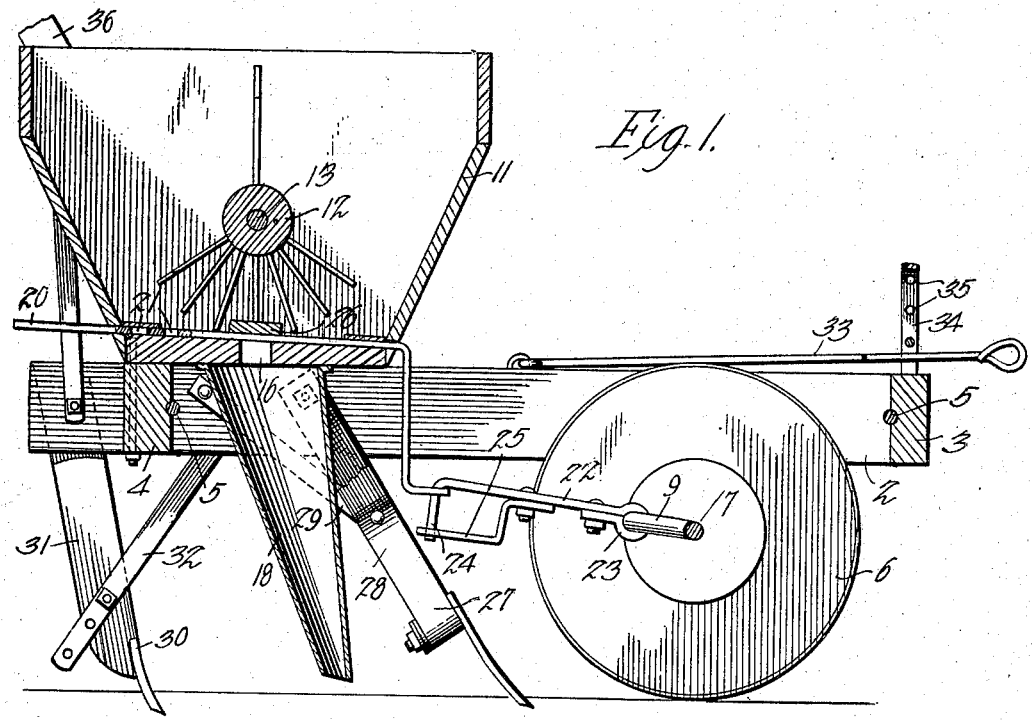
Figure 2:
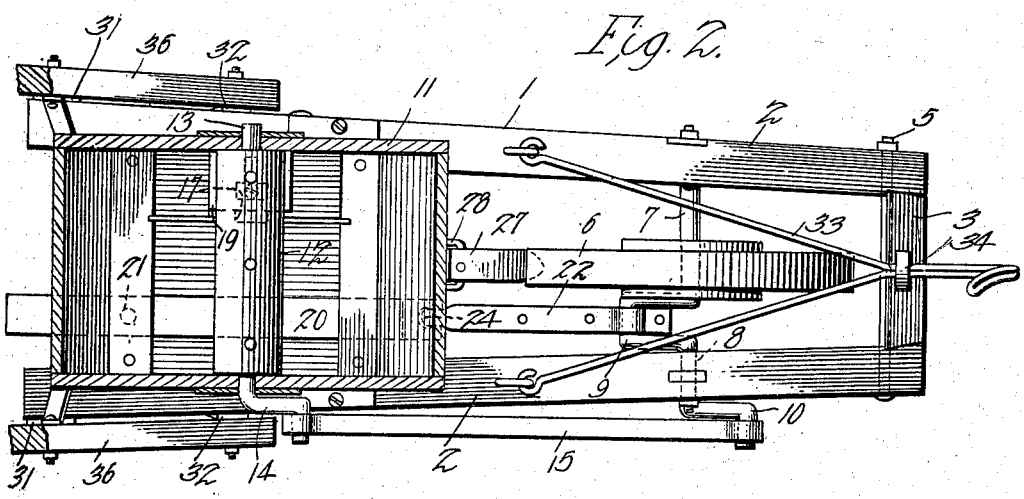

In the accompanying drawings, Figure 1 is a longitudinal sectional elevation. Fig. 2 is a top sectional plan.

Referring to the drawings, 1 indicates the main frame of the machine, comprising side bars 2, connected at their front ends by a transverse bar 3 and near their rear ends by a similar bar 4. The transverse bars 3 and 4 preferably have their ends mortised into the side bars and are held in place by drawing the side bars tightly together with tie-bolts 5.

6 is the ground-wheel, mounted on a shaft 7, journaled in bearings 8, depending from the lower sides of the side bars. The shaft at one side of the wheel is cranked, as at 9, between the wheel and the bearing 8 and is formed beyond the bearing with a second crank 10 for the purpose hereinafter described.

11 is a seed-hopper having an agitator 12 mounted therein on a shaft 13, journaled in the sides of the hopper. This shaft has its end at one side of the hopper extended beyond the same and formed into a crank-arm 14, connected by a link 15 with the crank-arm 10 on the drive-shaft of the machine, whereby the ground-wheel in its travel over the ground will operate the agitator in the hopper. The link is held in place by cotter-pins, thus permitting its ready detachment in order to throw the agitator out of operation.

Formed in the bottom of the hopper is a seed-discharge opening 16 and a fertilizer-discharge opening 17, both adapted to discharge into a vertical seed-tube 18. The fertilizer-opening is adapted to be closed at will by a sliding plate 19, connected to the upper face of the hopper-bottom by means of a screw and slot; but it may be arranged in any other suitable manner which will permit its ready movement over the opening to close the same.

20 is a seed-slide overlying the seed-opening in the bottom of the hopper and adapted to be reciprocated horizontally back and forth over the same in the manner and for the purpose presently described. The slide 20 has formed therethrough a plurality of seed-openings 21, adapted to alternately register with the opening in the bottom of the hopper for the discharge of the seed, as will be readily understood. By spacing the openings 21 a greater or lesser distance the distance between the hills may be varied or the seed may be planted continuously. In practice it is my intention to provide for each planter a plurality of these seed-slides having the openings variously spaced and to interchange the slides to meet the conditions under which the seed are to be planted. In order to provide for the ready interchanging of the slides, I employ a readily-detachable connection between the same and the ground-wheel by which they are reciprocated. This detachable connection comprises a link 22, connected at one end with the crank 9 of the drive-shaft by means of a removable plate 23, connected to the link by means of a bolt or other suitable securing means. The link at its inner end is bent at right angles to form a finger 24, engaged with an opening in the end of the slide 20, the end of the slide being extended downward from the seed hopper in order to bring it to a convenient position for attachment with the link. Detachably connected to the link by means of a bolt or the like is an angled plate or keeper 25, which extends beneath the end of the finger 24 and is provided with a suitable opening for the reception of the finger end. By this construction it will be seen that the slide may be readily detached from the link by removing the keeper 25, thus permitting the slide to be quickly changed or to be thrown out of action when it is desired to employ the device for distributing fertilizer only.

26 indicates a guide connected to the bottom of the hopper over the seed-slide and directly overlying the seed-opening in the hopper. This guide or shield serves the double function of holding the slide flush with the surface of the hopper-bottom and of preventing the accumulation and clogging of the seed at this point.

27 indicates a furrow-opener arranged immediately in rear of the ground-wheel and adapted to travel in the path of the same. This opener is connected to a shank or standard 28 in the form of a metal plate bent upon itself at its lower end to form a vertical slot for the reception of the bolt or the like by which the blade is attached to the standard and diverging at its upper ends for attachment in any suitable manner to the respective side bars of the frame. The standard is further secured to the frame by braces 29. It will be seen that the furrow-opening blade may be readily detached for the substitution of a new one or that it may be readily adjusted vertically to vary the depth of the furrow.

30 indicates two covering-blades removably attached, by means of bolts or the like, to the lower ends of shanks 31, which latter are pivoted at their upper ends to the side bars of the frame and are sustained by links 32. In practice these covering-blades usually project forwardly for entrance into the ground; but in some cases where the soil is of a very heavy nature and clogs the blades they may be swung on their pivots to a rearwardly-projecting position and travel with a dragging action through the ground. The links 32 are provided at their lower ends with a plurality of openings for their ready attachment to the shanks in either position of the latter.

33 indicates a draft-rod in the form of a metal bar bent upon itself at its center and having its rear ends spread and formed into suitable eyes connected, preferably, by staples with the upper face of the side bars, the outer free end of the draft-rod being formed into a suitable hook or loop for attachment with the harness of the draft-animals. The outer end of the draft-rod is mounted within a suitable guide or keeper 34 in the form of a metal plate looped at its center and having its sides extended parallel, with their free ends connected to the front transverse frame-bar 3. This keeper projects vertically upward from the frame and is provided with a plurality of transverse openings 35 for the reception of a pin or the like, which regulates the height of the outer end of the draft-rod and regulates the draft.

36 indicates the usual guiding-handles of the machine.

In operation the ground-wheel in its travel over the ground operates the agitator through the medium of cranks 10 and 14 and connecting-link 15 and at the same time reciprocates the seed-slide 20 through the medium of crank 9 and link 22, the fertilizer-opening being at this time closed by means of sliding plate 19. If it is desired to operate the seed-slide alone without operating the agitator, the link 15 is disconnected from the end of the crank 10 and is turned back and rests against the guiding-handle of the machine. In distributing fertilizer the seed-slide is thrown out of action by disconnecting the plate 25 and removing the finger 24 from the opening in the end of the slide, the agitator in the meantime remaining connected to the drive-shaft and the fertilizer-distributing opening uncovered. The distance between the hills is varied, as before set forth, by interchanging the slides.

In producing the device above described it will be seen that I provide for the ready removal of any of the wearing parts, thus adapting them to be readily replaced by new ones or interchanged to meet varying circumstances in the operation of the machine and that the parts are of such a simple nature (the machine being so constructed throughout without the employment of castings) that they may be readily reproduced.

It is to be understood that I do not limit myself to the precise details herein shown and described, inasmuch as such minor changes therein as may be found advantageous in practice may be made without departing from the spirit or scope of my invention.

Having thus described the invention, what is claimed is—

1. In a seed-planter, the combination with a hopper having a discharge-opening in its bottom, of a seed-slide having a plurality of seed-openings, a ground-wheel having a crank-arm adapted to operate the slide, and a link connecting the crank-arm and slide, said link being detachably connected with the slide by means of a finger engaging a perforation in the slide and an angled plate or keeper secured to the link and extending beneath the finger.

2. In a seed-planter, the combination with a hopper having a discharge-opening in its bottom, of a seed-slide having a plurality of seed-openings, a ground-wheel having a crank-arm adapted to operate the slide, and a link connecting the crank-arm and slide, said link having a finger detachably engaged with the slide and a removable keeper in the form of an angled plate detachably secured to the link and perforated for the reception of the end of the finger.

In testimony that I claim the foregoing as my own I have hereto affixed my signature in the presence of two witnesses.

WILLIAM H. COBLE.

Witnesses:
J. C. McL. AMIL,
L. B. CAMP.